United States Patent
Jiang et al.

(10) Patent No.: US 11,757,555 B2
(45) Date of Patent: Sep. 12, 2023

(54) METHOD AND APPARATUS FOR AN OPTICAL TRANSCEIVER

(71) Applicant: HUAWEI TECHNOLOGIES CO., LTD., Guangdong (CN)

(72) Inventors: Zhiping Jiang, Kanata (CA); Jun Luo, Dongguan (CN); Haitao Sun, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 109 days.

(21) Appl. No.: 17/521,984

(22) Filed: Nov. 9, 2021

(65) Prior Publication Data
US 2022/0069934 A1 Mar. 3, 2022

Related U.S. Application Data (63) Continuation of application No. PCT/CN2019/095790, filed on Jul. 12, 2019.

(51) Int. Cl.
*H04B 10/071* (2013.01)
*H04J 14/02* (2006.01)

(52) U.S. Cl.
CPC ........ *H04J 14/0227* (2013.01); *H04B 10/071* (2013.01); *H04J 14/0212* (2013.01); *H04J 14/0213* (2013.01)

(58) Field of Classification Search
CPC ............... H04J 14/0227; H04J 14/0212; H04J 14/0213; H04B 10/071
See application file for complete search history.

(56) References Cited

U.S. PATENT DOCUMENTS 5,488,501 A * 1/1996 Barnsley ............. H04J 14/0246
398/102
8,867,912 B2 * 10/2014 Sridhar ............... H04J 14/0275
398/43
(Continued)

FOREIGN PATENT DOCUMENTS

| CN | 109586787 A | 4/2019 |
| CN | 109756262 A | 5/2019 |

(Continued)

OTHER PUBLICATIONS

Extended European Search Report issued from the EPO dated Jun. 21, 2022 in connection with the corresponding European application No. 19938081.7; Sebastien Gade.

(Continued)

*Primary Examiner* — Tanya T Motsinger
(74) *Attorney, Agent, or Firm* — BCF LLP (57) ABSTRACT

The disclosed systems, structures, and methods are directed to an optical transceiver, employing a first optical time domain reflectometer (OTDR) module configured to generate a first OTDR signal, and a second OTDR signal, the second OTDR signal being a delayed version of the first OTDR signal, a first optical supervisory channel (OSC) transmitter configured to generate a first OSC signal, and a second OSC signal, the second OSC signal being a delayed version of the first OSC signal, a first wavelength division multiplexer (WDM) configured to transmit the first OSC signal interleaved with the first OTDR signal on a first optical fiber and a second WDM configured to transmit the second OSC signal interleaved with the second OTDR signal on a second optical fiber.

19 Claims, 7 Drawing Sheets

(56) References Cited

U.S. PATENT DOCUMENTS

| | | | |
|---|---|---|---|
| 10,211,920 B1* | 2/2019 | Khaleghi | H04B 10/25253 |
| 10,411,796 B1* | 9/2019 | Archambault | G01M 11/39 |
| 2003/0118352 A1 | 6/2003 | Choudhary et al. | |
| 2006/0182405 A1* | 8/2006 | Dorward | H04B 10/07 |
| | | | 385/134 |
| 2011/0008049 A1 | 1/2011 | Tanonaka et al. | |
| 2011/0102776 A1* | 5/2011 | Hasegawa | G01M 11/3136 |
| | | | 356/124.5 |
| 2016/0098913 A1* | 4/2016 | Vastmans | G01M 11/3154 |
| | | | 356/73.1 |
| 2017/0019168 A1 | 1/2017 | Menard et al. | |
| 2018/0123687 A1* | 5/2018 | Chang | H04J 14/0275 |
| 2019/0081709 A1* | 3/2019 | Weiner | H04B 10/25 |
| 2020/0099455 A1* | 3/2020 | Sun | H04B 10/07955 |

FOREIGN PATENT DOCUMENTS

| | | | | |
|---|---|---|---|---|
| WO | 2004079401 A2 | 9/2004 | | |
| WO | 2012003809 A1 | 1/2012 | | |
| WO | 2016075155 A1 | 5/2016 | | |
| WO | 2016145597 A1 | 9/2016 | | |
| WO | WO-2021007706 A1 * | 1/2021 | | H04B 10/071 |

OTHER PUBLICATIONS

International Search Report and Written Opinion of PCT/CN2019/095790; Fangtao Sun; dated Apr. 13, 2020.
Office Action issued from the Chinese Patent Office dated Jun. 8, 2022 in connection with the corresponding application No. 201980097984.0.

* cited by examiner

METHOD AND APPARATUS FOR AN OPTICAL TRANSCEIVER

CROSS-REFERENCE TO RELATED APPLICATION

This is a Continuation of PCT Application No. PCT/CN2019/095790, filed on Jul. 12, 2019.

FIELD OF THE INVENTION

The present disclosure generally relates to the field of optical communication networks and, in particular, to method and apparatus for an optical transceiver.

BACKGROUND

Most optical communication networks are employed with optical supervisory channels (OSCs) and optical time domain reflectometer (OTDRs). The International Telecommunication Union ITU-T G.692 recommendation defines an OSC as "A channel that is accessed at each optical line amplifier site that is used for maintenance purposes including (but not limited to) remote site alarm reporting, communication necessary for fault location, and orderwire. The Optical Supervisory Channel is not used to carry payload traffic".

In a practical implementation, the OSC is implemented on a wavelength $\lambda_{OSC}$ that is usually outside the transmission band, such as for example, C-band. Typical wavelengths associated with the OSC are 1510 nm, 1620 nm, 1310 nm or another proprietary wavelength. The OSC carries information about dense wavelength division multiplexed (DWDM) optical signals as well as remote conditions at the optical terminal or amplifier site. The OSC is also normally used for remote software upgrades, network management information and clock synchronization. The OSC signal structure is vendor specific, even if the ITU standard suggests using an OC-3 signal structure. Further, the OSC is always terminated at intermediate nodes, where it receives local information before retransmission. However, wavelengths associated traffic signals are terminated at endpoints of a light path.

Whereas, OTDRs are widely used in the area of testing fiber characteristics. The OTDRs measure the loss of optical signal strength in a section and the total loss encountered in an end-to-end network by tracking the attenuation in the optical signal. The OTDR operates by launching a short pulse of light of a predetermined wavelength $\lambda_{OTDR}$, into the fiber, and measuring the reflected signal as a function of time. Usually $\lambda_{OTDR}$ is also outside the transmission band.

In many applications, such as, for example, 4G or 5G, there is a requirement of clock synchronization. Most of the applications rely on optical communication networks to deliver synchronized clock over distance and often times the OSC is used to synchronize the clock. The clock synchronization is performed by OSC/OTDR module operating under OSC mode. During OTDR mode, there is an increase in clock synchronization error. Prior to 5G technology, the intermittent OSC was satisfying the clock synchronization requirements to a great extent.

However, 5G and similar applications have a much higher clock synchronization requirement. This challenge of higher clock synchronization requirement may be exacerbated by certain proposed enhancements to existing wireless communication systems as well as next-generation wireless communication designs. Such enhancements and designs include OSC/OTDR module can function as OSC or OTDR in an interleaving manner.

SUMMARY

An object of the present disclosure is to provide an optical transceiver. The disclosure presented herein employs a first optical time domain reflectometer (OTDR) module configured to generate a first OTDR signal, and a second OTDR signal, the second OTDR signal being a delayed version of the first OTDR signal, a first optical supervisory channel (OSC) transmitter configured to generate a first OSC signal, and a second OSC signal, the second OSC signal being a delayed version of the first OSC signal, a first wavelength division multiplexer (WDM) configured to transmit the first OSC signal interleaved with the first OTDR signal on a first optical fiber and a second WDM configured to transmit the second OSC signal interleaved with the second OTDR signal on a second optical fiber, wherein at any time during operation of the optical transceiver, at least one of the first and second OSC signals is present on a corresponding one of the first and second optical fibers.

In accordance with other aspects of the present disclosure the optical transceiver, further comprising an OSC receiver operatively connected to the first and second WDMs, the OSC receiver being configured to receive a third OSC signal interleaved with a third OTDR signal from the first WDM, receive a fourth OSC signal interleaved with a fourth OTDR signal from the second WDM and combine the third and fourth OSC signals to form an uninterrupted signal containing clock synchronization information.

In accordance with other aspects of the present disclosure the optical transceiver, wherein the OSC receiver further comprises a first delay element configured to provide delay adjustments to the third OSC signal interleaved with the third OTDR signal and a second delay element configured to provide delay adjustments to the fourth OSC signal interleaved with the fourth OTDR signal from the second WDM.

In accordance with other aspects of the present disclosure the optical transceiver, further comprising a controller configured to provide control signals to the first delay element and the second delay element.

In accordance with other aspects of the present disclosure the optical transceiver, further comprising a radio frequency (RF) switch configured to switch between the third OSC signal interleaved with the third OTDR signal and the fourth OSC signal interleaved with the fourth OTDR signal to form the uninterrupted signal containing clock synchronization information.

In accordance with other aspects of the present disclosure the optical transceiver, further comprising further comprising a logic processor configured to provide control signals to the RF switch, the controller and a peer optical transceiver.

In accordance with other aspects of the present disclosure the optical transceiver, wherein the first, second, third and fourth OSC signals include a switch window to assist the smooth switching operation without loss of any relevant information.

In accordance with other aspects of the present disclosure the optical transceiver, wherein the third OSC signal interleaved with the third OTDR signal and the fourth OSC signal interleaved with the fourth OTDR signal are received from a peer optical transceiver.

In accordance with other aspects of the present disclosure, there is provided a method implemented in an optical transceiver. The disclosure presented herein performs, generating a first optical time domain reflectometer (OTDR) signal and a second OTDR signal, the second OTDR signal being a delayed version of the first OTDR signal, generating a first optical supervisory channel (OSC) signal and a second OSC signal, the second OSC signal being a delayed version of the first OSC signal, interleaving the first OSC signal and the first OTDR signal, interleaving the second OSC signal and the second OTDR signal, transmitting the first OSC signal interleaved with the first OTDR signal on a first optical fiber, and transmitting the second OSC signal interleaved with the second OTDR signal on a second optical fiber, wherein at any time during operation of the optical transceiver, at least one of the first and second OSC signals is present on a corresponding one of the first and second optical fibers.

In accordance with other aspects of the present disclosure, the method implemented in an optical transceiver, further comprising receiving a third OSC signal interleaved with a third OTDR signal, receiving a fourth OSC signal interleaved with a fourth OTDR signal, and combining the third and fourth OSC signals to form an uninterrupted signal containing clock synchronization information.

In accordance with other aspects of the present disclosure, the method implemented in an optical transceiver, further comprising providing delay adjustments to the third OSC signal interleaved with the third OTDR signal and the fourth OSC signal interleaved with the fourth OTDR signal from the second WDM.

In accordance with other aspects of the present disclosure, the method implemented in an optical transceiver, wherein providing delay adjustments to the third OSC signal interleaved with the third OTDR signal and the fourth OSC signal interleaved with the fourth OTDR signal are in accordance control signals as supplied by a logic processing unit.

In accordance with other aspects of the present disclosure, the method implemented in an optical transceiver, wherein the delay adjustments are provided by a controller.

In accordance with other aspects of the present disclosure, the method implemented in an optical transceiver, further comprising, receiving the third OSC signal interleaved with the third OTDR signal and the fourth OSC signal interleaved with the fourth OTDR signal from a peer optical transceiver.

In accordance with other aspects of the present disclosure, the method implemented in an optical transceiver, further comprising switching between the third OSC signal interleaved with the third OTDR signal and the fourth OSC signal interleaved with the fourth OTDR signal to form the uninterrupted signal containing clock synchronization information.

In accordance with other aspects of the present disclosure, the method implemented in an optical transceiver, wherein the first, second, third and fourth OSC signals includes a switch window to assist the smooth switching operation without loss of any relevant information.

In accordance with other aspects of the present disclosure, the method implemented in an optical transceiver, wherein forming the uninterrupted signal containing clock synchronization information further comprises scanning the first OSC signal interleaved with the first OTDR signal and the second OSC signal interleaved with the second OTDR signal for delay pre-compensations until a correlation peak is found.

In accordance with other aspects of the present disclosure, the method implemented in an optical transceiver, wherein forming the uninterrupted signal containing clock synchronization information comprises alternative switching between the first OSC signal interleaved with the first OTDR signal and the second OSC signal interleaved with the second OTDR signal in accordance with control signals as supplied by a logic processing unit.

In accordance with other aspects of the present disclosure, the method implemented in an optical transceiver, further comprises providing control signals to a peer optical transceiver by a logic processing unit in order to assist the peer optical transceiver in phase pre-adjustments.

BRIEF DESCRIPTION OF THE FIGURES

The features and advantages of the present disclosure will become apparent from the following detailed description, taken in combination with the appended drawings, in which.

It is to be understood that throughout the appended drawings and corresponding descriptions, like features are identified by like reference characters. Furthermore, it is also to be understood that the drawings and ensuing descriptions are intended for illustrative purposes only and that such disclosures are not intended to limit the scope of the claims.

DETAILED DESCRIPTION

Unless otherwise defined, all technical and scientific terms used herein have the same meaning as commonly understood by one of ordinary skill in the art to which the described embodiments appertain to.

Figure 1:
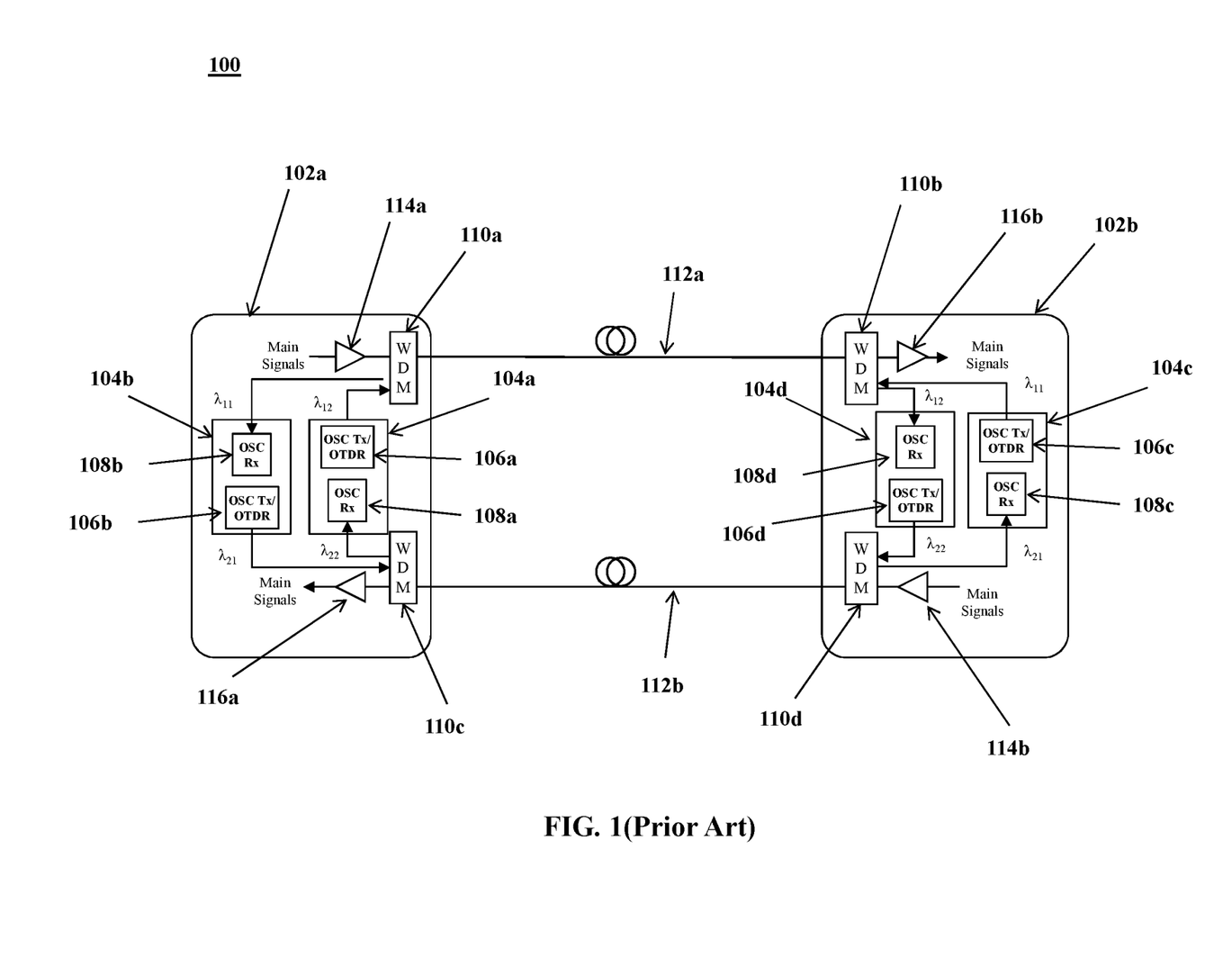
FIG. 1 (Prior Art) depicts a high-level functional block diagram of a conventional optical communication network.

FIG. 1 (Prior Art) depicts a high-level functional block diagram of a conventional optical communication network 100 directed to transmit and receive optical signals. The conventional optical communication network 100 includes optical transceivers 102a and 102b, and optical fibers 112a and 112b. It will be understood that other elements may be present, but are not illustrated for the purpose of tractability and simplicity.

As shown in FIG. 1, the optical transceiver 102a includes OSC transmitter/OTDR-OSC receiver modules 104a and 104b, wavelength division multiplexers (WDMs) 110a and 110*c*, amplifiers 114*a* and 116*a*. Similarly, the optical transceiver 102*b* includes OSC transmitter/OTDR-OSC receiver modules 104*c* and 104*d*, wavelength division multiplexers (WDMs) 110*b* and 110*d*, amplifiers 114*b* and 116*b*.

The conventional optical communication network 100 is configured to multiplex and transmits main signals consisting of around 100 channels in C-band (typically 1528 nm-1565 nm) with signals associated with OSC and OTDR outside C-band. OSC transmitter/OTDR-OSC receiver modules 104*a* and 104*b* employing OSC transmitter/OTDRs 106*a* and 106*b* are configured to generate signals at wavelengths $\lambda_{12}$, and $\lambda_{21}$ respectively. The generated signals are associated with OSC and OTDR, interleaved, and transmitted towards the optical transceiver 102*b*. OSC transmitter/OTDRs 106*c* and 106*d* employing OSC receivers 108*c* and 108*d* are configured to receive $\lambda_{21}$ and $\lambda_{12}$ respectively.

In a similar manner, OSC transmitter/OTDR-OSC receiver modules 104*c* and 104*d* employing OSC transmitter/OTDRs 106*c* and 106*d* are configured to generate signals at wavelengths $\lambda_{11}$, and $\lambda_{22}$ respectively. The generated signals are associated with OSC and OTDR, interleaved and transmitted towards optical transceiver 102*a*. It is to be understood that wavelengths $\lambda_{12}$ and $\lambda_{11}$ are different and transmitted over optical fiber 112*a* and wavelengths $\lambda_{21}$ and $\lambda_{22}$ are different and transmitted over optical fiber 112*b*. OSC transmitter/OTDRs 106*a* and 106*b* employing OSC receivers 108*a* and 108*b* are configured to receive $\lambda_{22}$, and $\lambda_{11}$ respectively.

Further, the OSC transmitter/OTDR-OSC receiver modules 104*a*, 104*b*, 104*c*, and 104*d* provide clock synchronization information while transmitting signals associated with OSC. However, OSC transmitter/OTDR-OSC receiver modules 104*a*, 104*b*, 104*c*, and 104*d* fail to provide clock synchronization information while transmitting signals associated with OTDR. Resulting in clock synchronization error and putting a limit on high speed operations of the conventional optical communication network 100.

Figure 2:
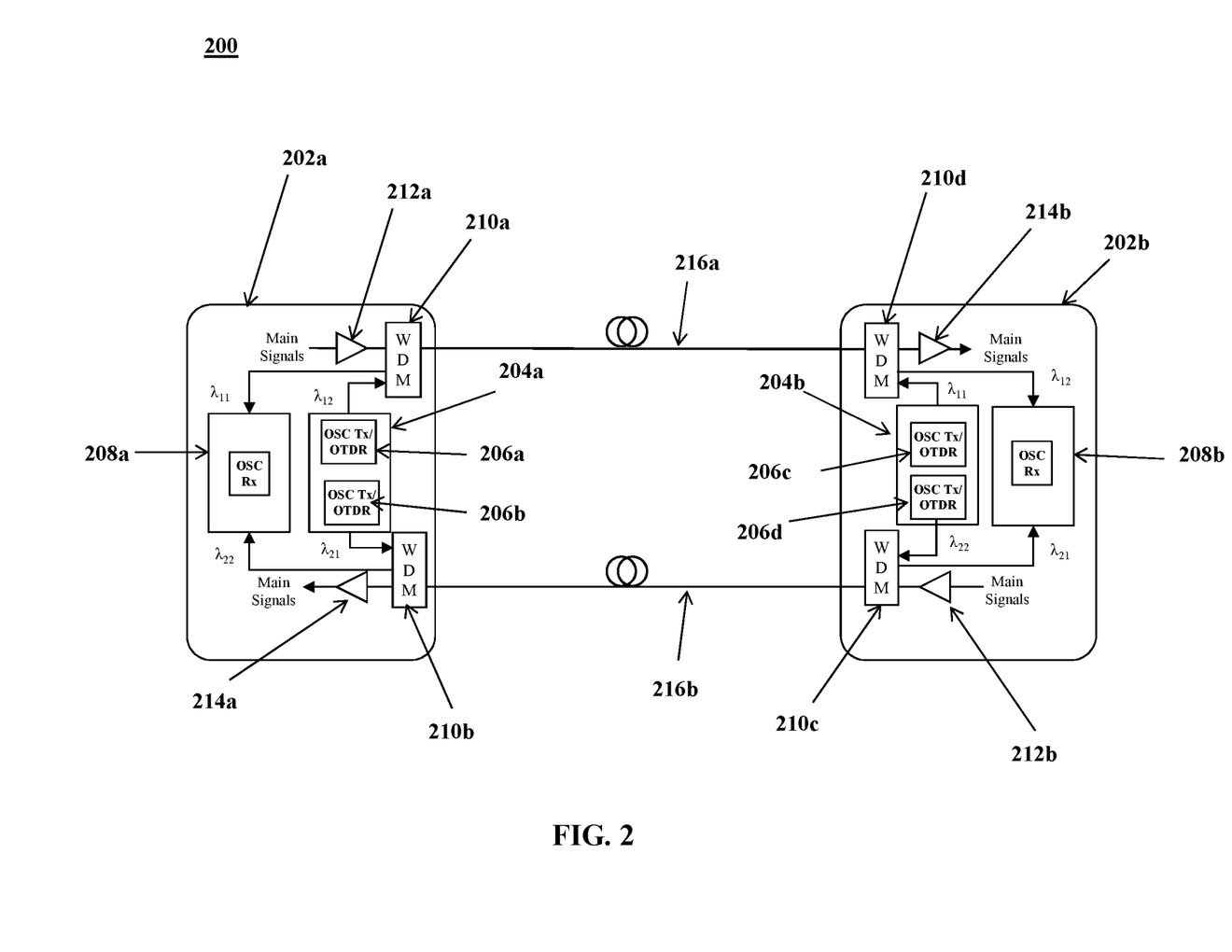
FIG. 2 illustrates a high-level functional block diagram of an uninterrupted clock synchronization-based optical communication network containing two optical transceivers, in accordance with various embodiments discussed in the present disclosure.

To this end, FIG. 2 illustrates a high-level functional block diagram of an uninterrupted clock synchronization-based optical communication network 200 containing two optical transceivers 202*a* and 202*b*, in accordance with various embodiments discussed in the present disclosure. The uninterrupted clock synchronization-based optical communication network 200 includes optical transceivers 202*a* and 202*b*, and optical fibers 216*a* and 216*b*. It will be understood that other elements may be present, but are not illustrated for the purpose of tractability and simplicity.

As shown in FIG. 2, the optical transceiver 202*a* includes an OSC transmitter/OTDR module 204*a*, an OSC receiver module 208*a*, wavelength division multiplexers (WDMs) 210*a* and 210*b*, amplifiers 212*a* and 214*a*. Similarly, the optical transceiver 202*b* includes an OSC transmitter/OTDR module 204*b*, an OSC receiver module 208*b*, wavelength division multiplexers (WDMs) 210*c* and 210*d*, amplifiers 212*b* and 214*b*.

The OSC transmitter/OTDR module 204*a* further employs a first OSC transmitter/OTDR 206*a* and a second OSC transmitter/OTDR 206*b*. The first OSC transmitter/OTDR 206*a* is configured to generate signals associated with OSC and OTDR at wavelengths $\lambda_{12}$ in an interleaved manner. Likewise, the second OSC transmitter/OTDR 206*b* may be configured to generate signals associated with OSC and OTDR at wavelengths $\lambda_{21}$ in an interleaved manner. Such that, for a window 404, the information is associated OSC and for a window 406 the information is associated OTDR. In certain embodiments, signals associated with OSC and OTDR may be generated separately and then interleaved.

In certain embodiments, the first OSC transmitter/OTDR 206*a* and second OSC transmitter/OTDR 206*b* are configured to operate in synchronization and transmit clock synchronization information over OSC. In so doing, clock synchronization information may be split into two identical streams and transmitted by the first OSC transmitter/OTDR 206*a* and the second OSC transmitter/OTDR 206*b*.

Figure 3:
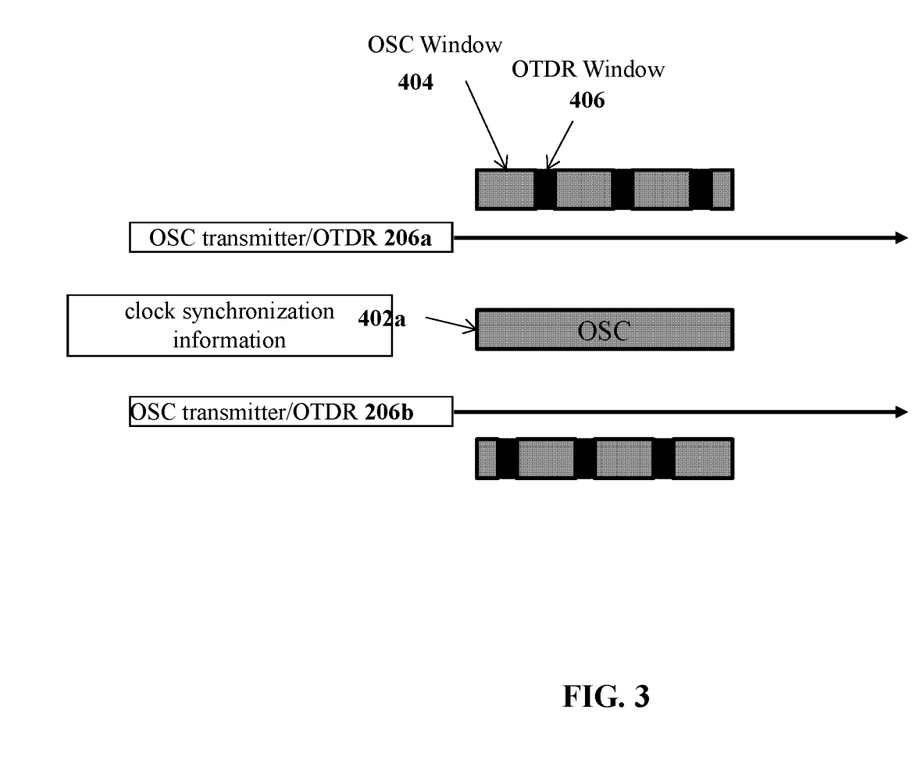
FIG. 3 illustrates representative frames of information transmitted by a first optical transceiver toward a second optical transceiver, in accordance with various embodiments discussed in the present disclosure.

FIG. 3 illustrates representative frames of information transmitted by the optical transceiver 202*a* toward the second optical transceiver 202*b*, in accordance with various embodiments discussed in the present disclosure. As shown, uninterrupted clock synchronization information 402*a* is split into two identical streams and is transmitted over the OSC using the first OSC transmitter/OTDR 206*a* and the second OSC transmitter/OTDR 206*b*. Each OSC window 404, carrying clock synchronization information is interrupted by an OTDR window 406. For example, the OSC transmitter/OTDR 206*b* transmitting clock synchronization information is first interrupted, the OSC transmitter/OTDR 206*a* transmitting clock synchronization information is then interrupted, and so on.

However, the OTDR windows 406 are designed such that at any given time, at least the first OSC transmitter/OTDR 206*a* or the second OSC transmitter/OTDR 206*b* is transmitting uninterrupted clock synchronization information. To this end, either of the OSC transmitter/OTDR 206*a* or the second OSC transmitter/OTDR 206*b* provides a time shift in clock synchronization information interleaved with OTDR information. Typically uninterrupted OSC windows 404 are significantly longer than the OTDR windows 406, and hence there remains a significant overlap time between OSC windows 404 as provided by the OSC transmitter/OTDRs 206*a* and 206*b*.

Returning to FIG. 2, main signals consisting of around 100 channels in C-band are pre-amplified using the amplifier 212*a* and are multiplexed using the WDM 212*a* with clock synchronization information interleaved with OTDR information as provided by the OSC transmitter/OTDR 206*a*. Further, this multiplexed information is transmitted towards the optical transceivers 202*b* using optical fiber 216*a*. Also, clock synchronization information interleaved with OTDR information as provided by the OSC transmitter/OTDR 206*b* is transmitted towards the optical transceivers 202*b* using the optical fiber 216*b*.

As shown in FIG. 2, at the other end of the optical fibers 216*a* and 216*b*, optical transceivers 202*b* employing the OSC transmitter/OTDR module 204*b* further employs a third OSC transmitter/OTDR 206*c* and a fourth OSC transmitter/OTDR 206*d*. Third OSC transmitter/OTDR 206*c* is configured to generate signals associated with OSC and OTDR at wavelengths $\lambda_{11}$ in an interleaved manner. Likewise, fourth OSC transmitter/OTDR 206*d* is configured to generate signals associated with OSC and OTDR at wavelengths $\lambda_{22}$ in an interleaved manner. Such that, for a window 404, the information is associated OSC and for a window 406 the information is associated OTDR.

It will be appreciated that, to efficiently utilize the wavelength resources, spatial area and optimize the overall cost of optical communication networks, in certain optical communication networks, OSCs and OTDR can be combined into one module OSC/OTDR and operated at same wavelength. Thus, OSC/OTDR module can function as OSC or OTDR in an interleaving manner. However, in an embodiment, the OSC transmitter/OTDR module 204*a*, the first OSC transmitter/OTDR 206a and the second OSC transmitter/OTDR 206b can be implemented as separate components. Also, each of the OSC transmitters can be implemented as a separate component from the respective OTDR modules.

Further, the third OSC transmitter/OTDR 206c and the fourth OSC transmitter/OTDR 206d are configured to operate in synchronization and transmit clock synchronization information over OSC. In so doing, clock synchronization information may be split into two identical streams and transmitted by the third OSC transmitter/OTDR 206a and the fourth OSC transmitter/OTDR 206b.

It will be appreciated that the optical transceiver 202b may operate in a similar manner as optical transceiver 202a. That is, optical transceiver 202b may be configured to pre-amplify main signals consisting of around 100 channels in C-band using the amplifier 212b and multiplex the amplified main signals with clock synchronization information interleaved with OTDR information as provided by the OSC transmitter/OTDR 206c using the WDM 210c. Further, this multiplexed information is transmitted towards the optical transceivers 202a using the optical fiber 216a. Also, clock synchronization information interleaved with OTDR information as provided by the OSC transmitter/OTDR 206d is transmitted towards the optical transceivers 202a using the optical fiber 216b.

It is to be understood that wavelengths $\lambda_{12}$ and $\lambda_{11}$ transmitted over the optical fiber 216a are different and wavelengths $\lambda_{21}$ and $\lambda_{22}$ transmitted over the optical fiber 216b are different. However, in certain embodiments, wavelength $\lambda_{12}$ may be approximately equal to wavelengths $\lambda_{21}$ or $\lambda_{22}$. Similarly, wavelength $\lambda_{11}$ may be approximately equal to wavelengths $\lambda_{21}$ or $\lambda_{22}$.

Further, the WDM 210a is configured to de-multiplex clock synchronization information interleaved with OTDR information at wavelength $\lambda_{11}$, as received from the optical transceivers 202b and provides the de-multiplexed clock synchronization information interleaved with OTDR information to the OSC receiver module 208a. Similarly, the WDM 210b may be configured to de-multiplex main signals and clock synchronization information interleaved with OTDR information at wavelength $\lambda_{22}$, as received from optical transceivers 202b and may provide the de-multiplexed main signals to the amplifier 214a and clock synchronization information interleaved with OTDR information to the OSC receiver module 208a.

In a similar manner, the WDM 210c may be configured to de-multiplex clock synchronization information interleaved with OTDR information at wavelength $\lambda_{21}$, as received from the optical transceivers 202a and may provide the de-multiplexed clock synchronization information interleaved with OTDR information to the OSC receiver module 208b. Similarly, the WDM 210d may be configured to de-multiplex main signals and clock synchronization information interleaved with OTDR information at wavelength $\lambda_{12}$, as received from the optical transceivers 202a and may provide the de-multiplexed main signals to the amplifier 214b and clock synchronization information interleaved with OTDR information to the OSC receiver module 208b.

Figure 4A:
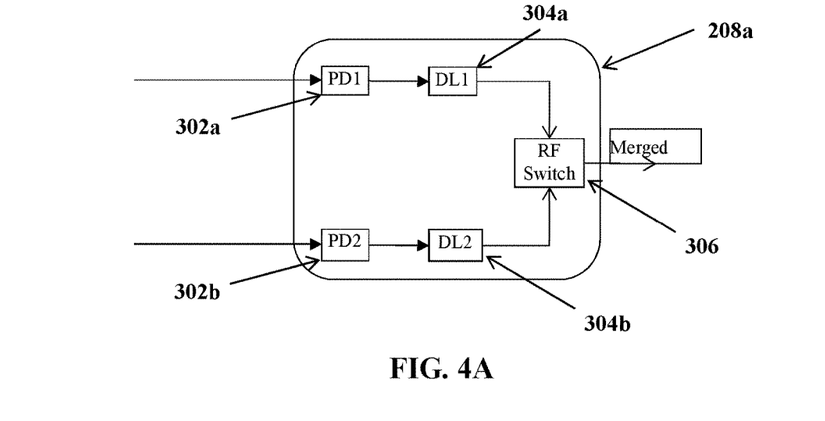
FIG. 4A illustrates a basic block diagram of OSC receiver module in an optical transceiver, in accordance with various embodiments discussed in the present disclosure.

FIG. 4A illustrates a basic block diagram of OSC receiver module 208a in the optical transceiver 202a, in accordance with various embodiments discussed in the present disclosure. As shown, the OSC receiver module 208a includes photo detectors 302a and 302b, delay elements 304a and 304b and a radio frequency (RF) switch 306. It will be understood that other elements may be present, but are not illustrated for the purpose of tractability and simplicity.

As shown, photo detectors 302a and 302b may be configured to receive clock synchronization information interleaved with OTDR information at wavelengths $\lambda_{11}$ and $\lambda_{22}$ respectively. Further, photo detectors 302a and 302b may be configured to generate electrical signals corresponding to clock synchronization information interleaved with OTDR information at wavelengths $\lambda_{11}$ and $\lambda_{22}$ and supply the electrical signals to delay elements 304a and 304b for further processing.

Delay elements 304a and 304b may be configured to provide delay adjustments to the received electrical signals such that clock synchronization information interleaved with OTDR information at wavelengths $\lambda_{11}$ and $\lambda_{22}$ may be aligned and combined using the radio frequency (RF) switch 306 to form one uninterrupted signal corresponding to clock synchronization information.

Figure 4B:
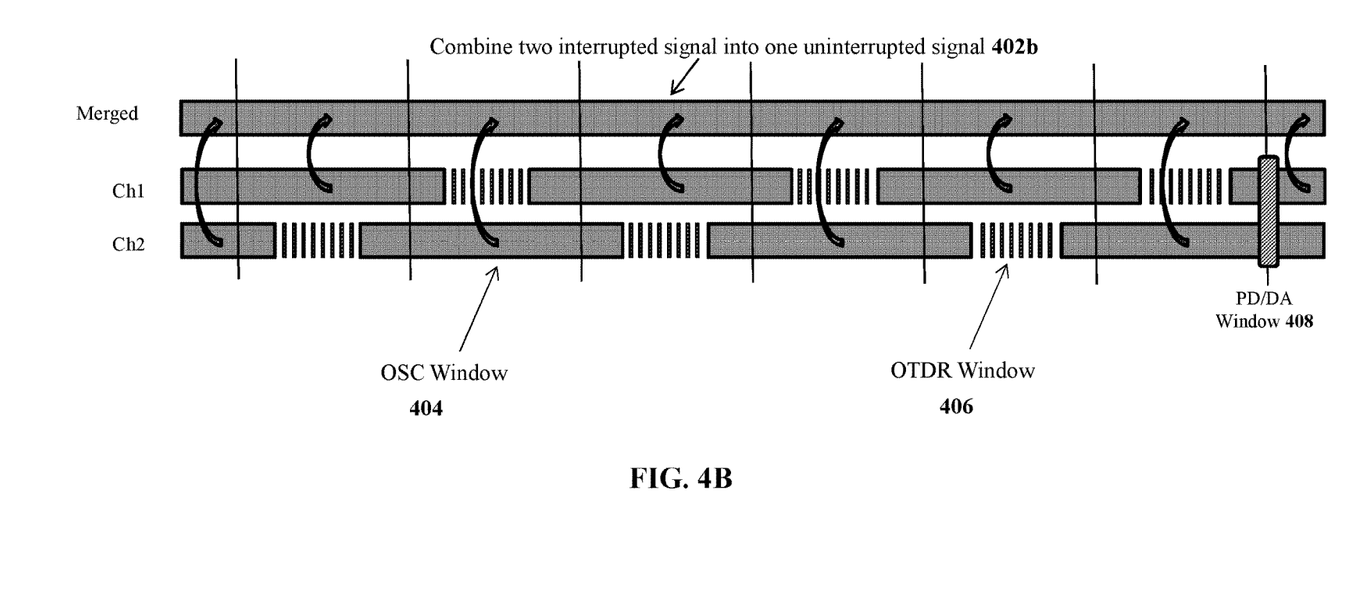
FIG. 4B illustrates representative windows of information received by the OSC receiver module, in accordance with various embodiments discussed in the present disclosure.

FIG. 4B illustrates representative windows of information received by the OSC receiver module 208a, in accordance with various embodiments discussed in the present disclosure. As shown, the clock synchronization information alternates on each channel in such a manner that at any instant at least one channel is carrying clock synchronization information. Further, the duration of OSC window 404 is more than the duration of OTDR window 406, such that there is an overlapping of clock synchronization information in each channel. As shown, such overlapping region may contain a phase detection/delay adjustment (PD/DA) window 408.

As such, delay adjustments are provided to align the clock synchronization information in two channels, such that during channel selection, the two channels may contain clock synchronization information and channel selection may be performed in the PD/DA window 408. It will be appreciated that each overlapping region will have the PD/DA window 408 to assist in channel selection.

Figure 5A:
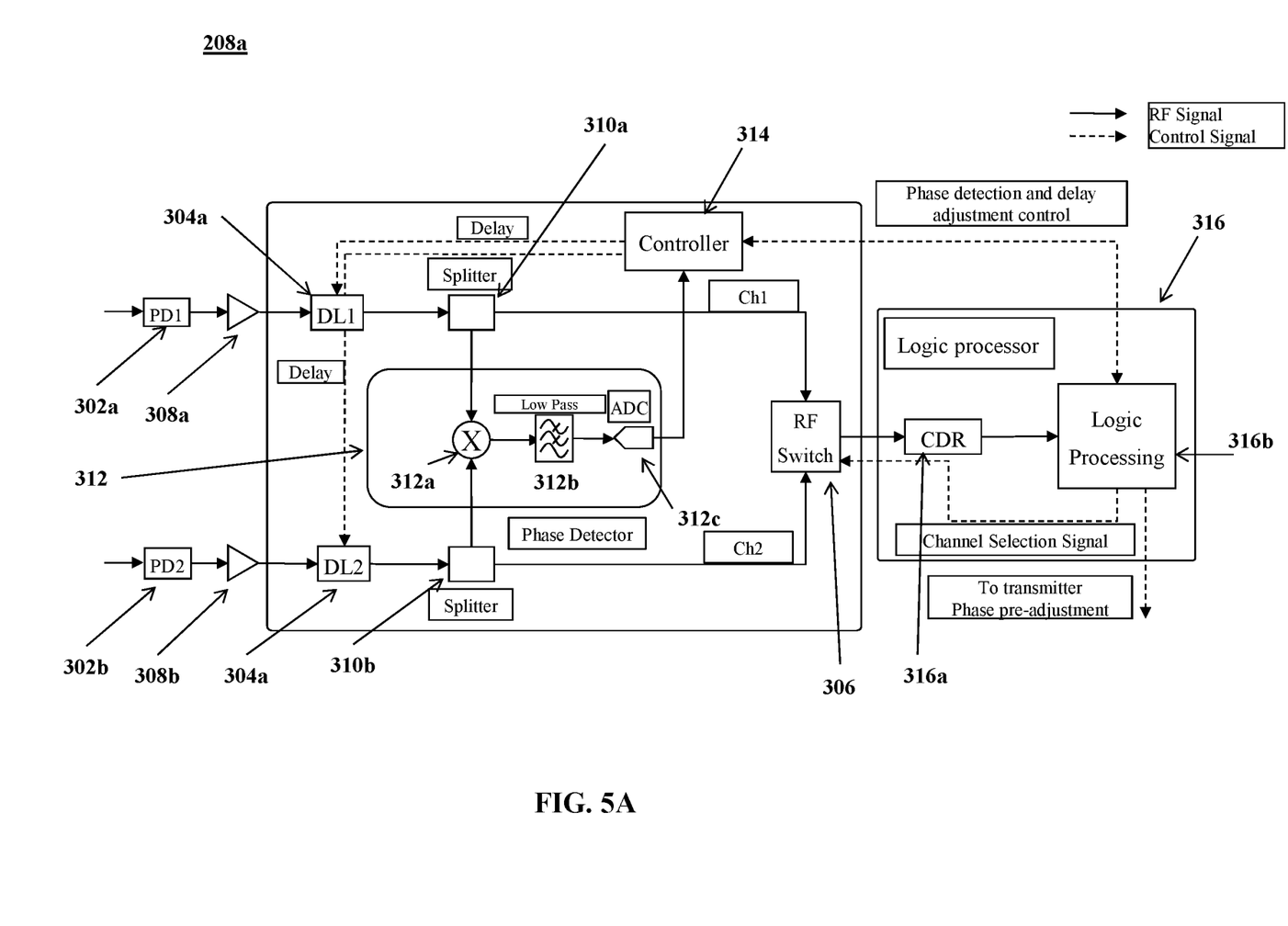
FIG. 5A illustrates a detailed functional block diagram of the OSC receiver module, in accordance with various embodiments discussed in the present disclosure.

FIG. 5A illustrates a detailed functional block diagram of the OSC receiver module 208a, in accordance with various embodiments discussed in the present disclosure. As shown, the OSC receiver module 208a may further include amplifiers 308a and 308b, splitters 310a and 310b, a phase detector 312, a controller 314 and a logic processor 316. The logic processor 316 further includes a clock data recovery (CDR) unit 316a and a logic processing unit 316b.

As previously discussed, photo detectors 302a and 302b may be configured to generate electrical signals corresponding to clock synchronization information interleaved with OTDR information at wavelengths $\lambda_{11}$ and $\lambda_{22}$. Electrical signals are then amplified using amplifiers 308a and 308b. The amplified electrical signals may be then forwarded to delay elements 304a and 304b for delay adjustments. Delay elements 304a and 304b may provide the required delays to the electrical signals for alignment and may supply the adjusted electrical signals to splitters 310a and 310b. Splitters 310a and 310b may be configured to split the amplified electrical signals such that electrical signals may be supplied to the phase detector 312 and the RF switch 306.

In certain embodiments phase detector 312 further includes a multiplier 312a, a low-pass filter 312b and an analog-to-digital converter (ADC) 312c. The phase detector 312 may be configured to detect analog phase difference signals between the electrical signals supplied by splitters 310a and 310b. In so doing, the multiplier 312a mixes the electrical signals and may supply the mixed electrical signals to the low-pass filter 312b. The low-pass filter 312b may then supply a voltage corresponding to the analog phase difference signals, between the electrical signals supplied by splitters 310a and 310b, to the ADC 312c. The ADC 312c converts the analog phase difference signals to digital phase difference signals and supplies the digital phase difference signals to the controller 314. However, it is to be understood that the phase difference detection may be achieved by other suitable techniques, without departing from the principles presented herein.

The controller 314 may be configured to communicate control signals, such as, for example, phase detection and delay adjustment control signals, with the logic processing unit 316b in addition to receiving the digital phase difference signals as supplied by the phase detector 312. To this end, the controller 314 may adjust the delays of delay elements 304a and 304b in accordance with control signals and digital phase difference signals. It will be further appreciated that in certain embodiments, phase difference detection and delay adjustment may be performed during the overlapping region of clock synchronization information in two channels.

In certain embodiments, the logic processing unit 316b may provide channel selection control signals to the RF switch 306. Based on channel selection control signals, the RF switch 306 may select one of the two channels to provide an uninterrupted signal corresponding to clock synchronization information to the CDR unit 316a. The CDR unit 316a may further process and provide clock synchronization information to the logic processing unit 316b.

In certain situations, clock synchronization information interleaved with OTDR information at wavelengths $\lambda_{11}$, travelling through the optical fiber 216a and clock synchronization information interleaved with OTDR information at wavelengths $\lambda_{22}$, travelling through the optical fiber 216b might have a differential delay greater than the delay compensation capability of delay elements 304a and 304b. In certain embodiments, these differential delays may be pre-compensated at the third OSC transmitter/OTDR 206c and the fourth OSC transmitter/OTDR 206d.

To this end, in certain embodiments, the logic processing unit 316b may be configured to measure the differential delays by selecting either of the two channels carrying clock synchronization information interleaved with OTDR information and may provide the measured differential delays back to the third OSC transmitter/OTDR 206c and the fourth OSC transmitter/OTDR 206d for pre-compensation of the differential delays. As such, the third OSC transmitter/OTDR 206c and the fourth OSC transmitter/OTDR 206d may be configured to compensate for the differential delays prior to sending clock synchronization information interleaved with OTDR information over optical fibers 216a and 216b.

In certain embodiments, the third OSC transmitter/OTDR 206c and the fourth OSC transmitter/OTDR 206d may be configured to scan clock synchronization information interleaved with OTDR information at wavelengths $\lambda_{11}$, and clock synchronization information interleaved with OTDR information at wavelengths $\lambda_{22}$ for the differential delay pre-compensations until a correlation peak is found. In such embodiments, the third OSC transmitter/OTDR 206c and the fourth OSC transmitter/OTDR 206d may be configured to pre-compensate clock synchronization information interleaved with OTDR information for differential delays without any feedback from logic processing unit 316b.

It should be understood that the third OSC transmitter/OTDR 206c and the fourth OSC transmitter/OTDR 206d may use any suitable technique to compute and pre-compensate differential delays in clock synchronization information interleaved with OTDR information at wavelengths $\lambda_{11}$, and clock synchronization information interleaved with OTDR information at wavelengths $\lambda_{22}$.

It should also be understood that the OSC transmitter/OTDR module 204a and the OSC receiver module 208a may be configured to operate in a similar manner as the OSC transmitter/OTDR module 204b and the OSC receiver module 208b, without departing from the principles presented herein.

Figure 5B:
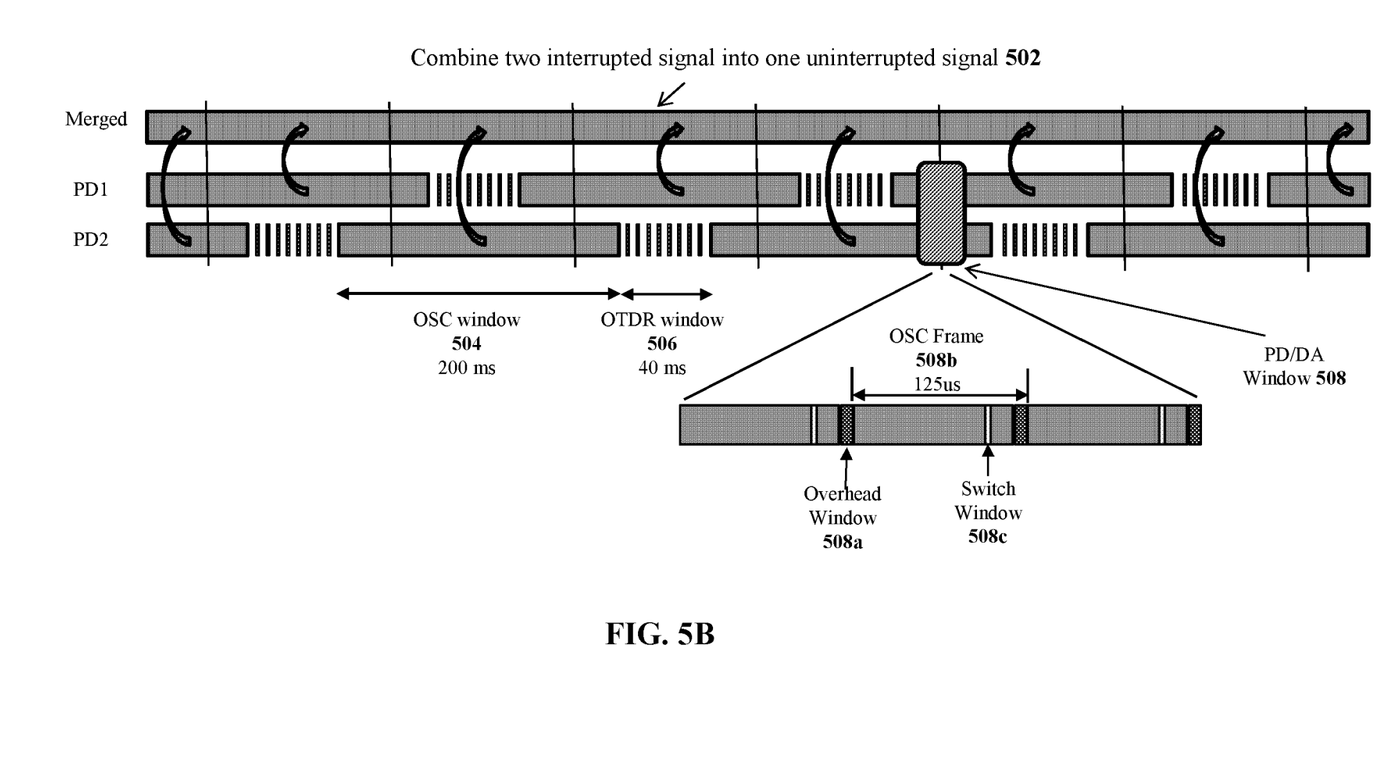
FIG. 5B illustrates representative windows of information received by the OSC receiver module, in accordance with various embodiments discussed in the present disclosure.

FIG. 5B illustrates representative windows of information received by the OSC receiver modules 208a and 208b, in accordance with various embodiments discussed in the present disclosure. By way of an illustrative example, OSC may have uninterrupted windows 504 of 200 ms and OTDR may have an uninterrupted windows 506 of 40 ms. Further, each OSC window 504 may have 1600 OSC frames and each OTDR window 506 may have 320 OTDR frames. Such that, each of the OSC frames 508b or OTDR frames may have duration of 125 µs.

Since, at any time, at least one of the two channels is carrying clock synchronization information uninterrupted by OTDR information, therefore clock synchronization information in the two channels may have overlapping regions for 160 ms. This 160 ms of overlap may be used by OSC receiver modules 208a and 208b to compute phase difference and provide delay adjustments to clock synchronization information interleaved with OTDR information in two channels. Further, each of the OSC frames 508b may contain an overhead window 508a.

Moreover, two channels may have identical information with time delays, the phase detector 314 may provide an output a voltage in accordance with the time delay between two channels. To this end, the phase detector 314 may use any suitable algorithm, such as, for example, hill climbing algorithm to maximize the voltage resulting in alignment of two channels. It is to be understood that the alignment may be performed repeatedly at every PD/DA window 508 corresponding to each OSC window 504.

Once the channels are aligned, the RF switch 306 may perform switching between two channels to provide uninterrupted signal 502 corresponding to clock synchronization information. In certain embodiments, each OSC frame 508b may have a switch window 508c to assist the smooth switching operation without loss of any relevant information. All of the associated timing information may be pre-designed and managed by logic processor 316.

Figure 6:
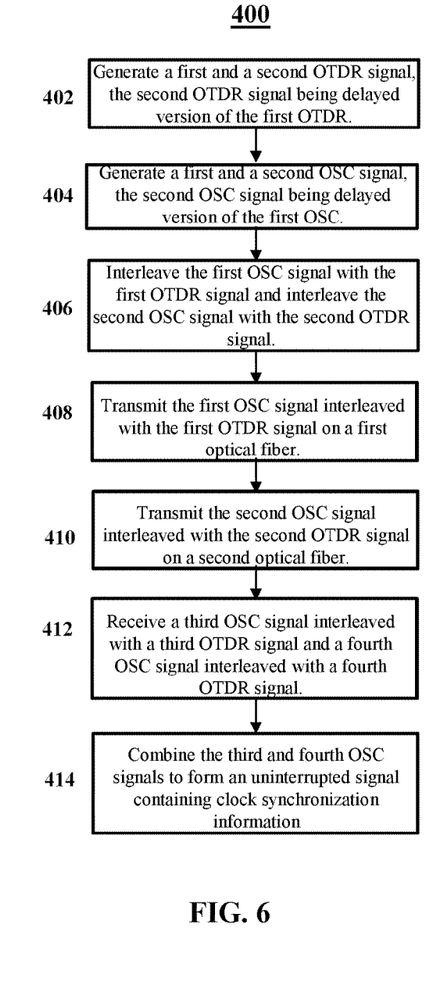
FIG. 6 depicts a functional flow diagram of process directed to a method implemented in an optical transceiver, in accordance with various embodiments of the present disclosure.

FIG. 6 depicts a functional flow diagram of process 400 directed to a method implemented in an optical transceiver, in accordance with various embodiments of the present disclosure.

Process 400 commences at task block 402, where the optical transceiver 202a generates a first OTDR signal and a second OTDR signal, the second OTDR signal being delayed version of the first OTDR signal. As noted above, the first OSC transmitter/OTDRs 206a and 206b generate signals associated with OTDR at wavelengths $\lambda_{12}$, and $\lambda_{21}$.

Process 400 proceeds at task block 404, where the optical transceiver 202a generates a first OSC signal and a second OSC signal, the second OSC signal being delayed version of the first OSC signal. As noted above, the first OSC transmitter/OTDR 206a and the second OSC transmitter/OTDR 206b generate signals associated with OSC at wavelengths $\lambda_{12}$, and $\lambda_{21}$ respectively.

At task block 406, the optical transceiver 202a interleaves the first OSC signal with the first OTDR signal and interleaves the second OSC signal with the second OTDR signal. As discussed above, the first OSC transmitter/OTDR 206a to interleaves the signals associated with OSC and OTDR at wavelength $\lambda_{12}$ and the second OSC transmitter/OTDR 206b interleaves the signals associated with OSC and OTDR at wavelength $\lambda_{21}$.

Process 400 proceeds at task block 408, where the optical transceiver 202a transmits the first OSC signal interleaved with the first OTDR signal on a first optical fiber. As described above, WDM 210a receives and transmit the first OSC signal interleaved with the first OTDR signal generated at wavelengths $\lambda_{12}$, over optical fibers 216a.

Process 400 advances at task block 410, where the optical transceiver 202a transmits the second OSC signal interleaved with the second OTDR signal on a second optical fiber. As described above, WDM 210b receives and transmits the second OSC signal interleaved with the second OTDR signal generated at wavelengths $\lambda_{21}$, over optical fibers 216b.

At task block 412, where the optical transceiver 202a receives a third OSC signal interleaved with a third OTDR signal and a fourth OSC signal interleaved with a fourth OTDR signal. As noted above, WDMs 210a and 210b receive the third OSC signal interleaved with the third OTDR signal and the fourth OSC signal interleaved with the fourth OTDR signal generated at wavelengths $\lambda_{11}$, and $\lambda_{22}$ transmitted by the optical transceiver 202b over optical fibers 216a and 216b respectively.

Finally at task block 414, the optical transceiver 202a combines the third and fourth OSC signals to form an uninterrupted signal containing clock synchronization information. As noted above, RF switch 306 may make alternative switching between two channels in accordance with control signals as supplied by logic processing unit 316b. In so doing, RF switch 306 may provide an uninterrupted signal corresponding to clock synchronization information at wavelengths $\lambda_{11}$ and $\lambda_{22}$.

Thus, by virtue of techniques provided by uninterrupted clock synchronization-based optical communication network 200, efficient utilization of available area and power may be achieved, such that efficiency of designing ICs incorporating CMUs and multiple SerDes may be increased through the use of efficient components and design.

It is to be understood that the operations and functionality of the described uninterrupted clock synchronization-based optical communication network 200, constituent components, and associated processes may be achieved by any one or more of hardware-based, software-based, and firmware-based elements. Such operational alternatives do not, in any way, limit the scope of the present disclosure.

It will also be understood that, although the embodiments presented herein have been described with reference to specific features and structures, it is clear that various modifications and combinations may be made without departing from such disclosures. The specification and drawings are, accordingly, to be regarded simply as an illustration of the discussed implementations or embodiments and their principles as defined by the appended claims, and are contemplated to cover any and all modifications, variations, combinations or equivalents that fall within the scope of the present disclosure.

What is claimed is:

1. An optical transceiver, comprising:
   a first optical time domain reflectometer (OTDR) module configured to:
     generate a first OTDR signal, and
     generate a second OTDR signal, the second OTDR signal being a delayed version of the first OTDR signal; and
   a first optical supervisory channel (OSC) transmitter configured to:
     generate a first OSC signal,
     generate a second OSC signal, the second OSC signal being a delayed version of the first OSC signal,
     interleave the first OSC signal and the first OTDR signal, and
     interleave the second OSC signal and the second OTDR signal;
   a first wavelength division multiplexer (WDM) configured to transmit the first OSC signal interleaved with the first OTDR signal on a first optical fiber; and
   a second WDM configured to transmit the second OSC signal interleaved with the second OTDR signal on a second optical fiber;
   wherein, at any time during operation of the optical transceiver, at least one of the first and second OSC signals is present on a corresponding one of the first and second optical fibers.

2. The optical transceiver of claim 1, further comprising an OSC receiver operatively connected to the first and second WDMs, the OSC receiver being configured to:
   receive a third OSC signal interleaved with a third OTDR signal from the first WDM;
   receive a fourth OSC signal interleaved with a fourth OTDR signal from the second WDM; and
   combine the third and fourth OSC signals to form an uninterrupted signal containing clock synchronization information.

3. The optical transceiver of claim 2, wherein the OSC receiver further comprises a first delay element configured to provide delay adjustments to the third OSC signal interleaved with the third OTDR signal and a second delay element configured to provide delay adjustments to the fourth OSC signal interleaved with the fourth OTDR signal from the second WDM.

4. The optical transceiver of claim 3, further comprising a controller configured to provide control signals to the first delay element and the second delay element.

5. The optical transceiver of claim 4, further comprising a radio frequency (RF) switch configured to switch between the third OSC signal interleaved with the third OTDR signal and the fourth OSC signal interleaved with the fourth OTDR signal to form the uninterrupted signal containing clock synchronization information.

6. The optical transceiver of claim 5, further comprising further comprising a logic processor configured to provide control signals to the RF switch, the controller and a peer optical transceiver.

7. The optical transceiver of claim 2, wherein the first, second, third and fourth OSC signals include a switch window to assist the smooth switching operation without loss of any relevant information.

8. The optical transceiver of claim 2, wherein the third OSC signal interleaved with the third OTDR signal and the fourth OSC signal interleaved with the fourth OTDR signal are received from a peer optical transceiver.

9. A method implemented in an optical transceiver, comprising:
   generating a first optical time domain reflectometer (OTDR) signal and a second OTDR signal, the second OTDR signal being a delayed version of the first OTDR signal;
   generating a first optical supervisory channel (OSC) signal and a second OSC signal, the second OSC signal being a delayed version of the first OSC signal;

interleaving the first OSC signal and the first OTDR signal;

interleaving the second OSC signal and the second OTDR signal;

transmitting the first OSC signal interleaved with the first OTDR signal on a first optical fiber; and transmitting the second OSC signal interleaved with the second OTDR signal on a second optical fiber;

wherein, at any time during operation of the optical transceiver, at least one of the first and second OSC signals is present on a corresponding one of the first and second optical fibers.

10. The method of claim 9, further comprising:

receiving a third OSC signal interleaved with a third OTDR signal;

receiving a fourth OSC signal interleaved with a fourth OTDR signal; and combining the third and fourth OSC signals to form an uninterrupted signal containing clock synchronization information.

11. The method of claim 10, further comprising providing delay adjustments to the third OSC signal interleaved with the third OTDR signal and the fourth OSC signal interleaved with the fourth OTDR signal from the second WDM.

12. The method of claim 11, wherein providing delay adjustments to the third OSC signal interleaved with the third OTDR signal and the fourth OSC signal interleaved with the fourth OTDR signal are in accordance control signals as supplied by a logic processing unit.

13. The method of claim 11, wherein the delay adjustments are provided by a controller.

14. The method of claim 10, further comprising, receiving the third OSC signal interleaved with the third OTDR signal and the fourth OSC signal interleaved with the fourth OTDR signal from a peer optical transceiver.

15. The method of claim 10, further comprising switching between the third OSC signal interleaved with the third OTDR signal and the fourth OSC signal interleaved with the fourth OTDR signal to form the uninterrupted signal containing clock synchronization information.

16. The method of claim 10, wherein the first, second, third and fourth OSC signals includes a switch window to assist the smooth switching operation without loss of any relevant information.

17. The method of claim 10, wherein forming the uninterrupted signal containing clock synchronization information further comprises scanning the first OSC signal interleaved with the first OTDR signal and the second OSC signal interleaved with the second OTDR signal for delay pre-compensations until a correlation peak is found.

18. The method of claim 10, wherein forming the uninterrupted signal containing clock synchronization information comprises alternative switching between the first OSC signal interleaved with the first OTDR signal and the second OSC signal interleaved with the second OTDR signal in accordance with control signals as supplied by a logic processing unit.

19. The method of claim 10, further comprising providing control signals to a peer optical transceiver by a logic processing unit in order to assist the peer optical transceiver in phase pre-adjustments.

\* \* \* \* \*

UNITED STATES PATENT AND TRADEMARK OFFICE
CERTIFICATE OF CORRECTION

PATENT NO. : 11,757,555 B2
APPLICATION NO. : 17/521984
DATED : September 12, 2023
INVENTOR(S) : Zhiping Jiang et al.

It is certified that error appears in the above-identified patent and that said Letters Patent is hereby corrected as shown below:

In the Claims

In Column 12, Claim 6, Lines 46-47, "The optical transceiver of claim 5, further comprising further comprising a logic processor configured to provide" should read --The optical transceiver of claim 5, further comprising a logic processor configured to provide--

Signed and Sealed this
First Day of October, 2024

Katherine Kelly Vidal
*Director of the United States Patent and Trademark Office*